United States Patent [19]

Citta et al.

[11] Patent Number: 4,706,284

[45] Date of Patent: * Nov. 10, 1987

[54] TELEVISION SIGNAL DATA TRANSMISSION SYSTEM

[75] Inventors: Richard W. Citta, Oak Park; Dennis M. Mutzabaugh; Gary J. Sgrignoli, both of Mt. Prospect, all of Ill.

[73] Assignee: Zenith Electronics Corporation, Glenview, Ill.

[*] Notice: The portion of the term of this patent subsequent to Nov. 10, 2004 has been disclaimed.

[21] Appl. No.: 712,949

[22] Filed: Mar. 15, 1985

[51] Int. Cl.⁴ .............................................. H04N 7/167
[52] U.S. Cl. ......................................... 380/12; 380/15
[58] Field of Search ............... 358/124, 120, 122, 123, 358/114, 118, 117

[56] References Cited

U.S. PATENT DOCUMENTS

| | | | |
|---|---|---|---|
| 2,624,797 | 1/1953 | Lawson et al. | 178/5.6 |
| 2,892,882 | 6/1959 | Hughes | 178/5.1 |
| 3,527,877 | 9/1970 | Walker | 358/124 |
| 3,852,519 | 12/1974 | Court | 358/122 |
| 4,295,155 | 10/1981 | Jarger et al. | 358/12 |
| 4,353,088 | 10/1982 | den Toonder et al. | 358/120 |
| 4,390,898 | 6/1983 | Bond et al. | 358/119 |
| 4,467,353 | 8/1984 | Citta et al. | 358/120 |

*Primary Examiner*—Stephen C. Buczinski
*Assistant Examiner*—Melissa L. Koltak

[57] ABSTRACT

A television signal data transmission system comprises means for transmitting a television signal in which the phase of the RF carrier is modified during a periodically recurring interval by a SAW filter having a varying phase response between the video and audio carrier frequencies of the signal. The periodically recurring interval is modulated between a first width and a second smaller width respectively representing complementary logic states of a data bit. The first width of the width modulated interval preferably extends between two points respectively located within the non-viewable, overscan portions of the video signal immediately adjacent and on either side of a horizontal blanking interval of the television signal. The transmitted signal is received by a decoder which includes a phase modulation detector for detecting the width modulated intervals and a pulse width discriminator responsive thereto for deriving the data bits.

32 Claims, 14 Drawing Figures

TELEVISION SIGNAL DATA TRANSMISSION SYSTEM

CROSS REFERENCE TO RELATED APPLICATION

This application is related to application Ser. No. 711,947, entitled "Television Signal Scrambling System", in the names of Richard W. Citta, Dennis Mutzabaugh and Gary Sgrignoli, filed of even date herewith and assigned to Zenith Electronics Corporation.

BACKGROUND OF THE INVENTION

The present invention relates generally to communication systems for transmitting and receiving data in conjunction with a broadcast television signal and more particularly concerns the transmission and reception of data in subscription television systems.

In subscription television systems, television signals are typically transmitted to system subscribers in a scrambled form either along a coaxial cable or as an "over-the-air" broadcast. Each system subscriber is provided with a decoder operable for unscrambling the transmitted television signal and for supplying the unscrambled signal to a conventional television receiver for viewing. In addition, many present-day subscription television systems are addressable in nature whereby the operation of individual decoders may be selectively controlled through the transmission of system control data generated at the system head-end. The system control data may include such information as subscriber address codes, subscriber authorization codes, program codes and the like enabling the system operator to designate different levels or tiers of programming authorized for different individual subscribers.

Various techniques are known in the industry for transmitting such system control data in conjunction with a television signal. These known techniques, however, are normally limited in the amount of data which can be transmitted in a reasonable time frame and typically require the use of relatively complex and therefore expensive data encoding and decoding apparatus.

OBJECTS OF THE INVENTION

It is therefore a general object of the present invention to provide an improved technique for transmitting data in conjunction with a scrambled broadcast television signal.

It is a more specific object of the invention to provide a subscription television data transmission system capable of transmitting relatively large amounts of data in conjunction with a broadcast television signal yet requiring the use of relatively non-complex and inexpensive data encoding and decoding apparatus.

BRIEF DESCRIPTION OF THE DRAWINGS

Features of the invention which are believed to be novel are set forth with particularity in the appended claims. The invention, together with its objects and the advantages thereof, may best be understood by reference to the following description taken in conjunction with the accompanying drawings in which:

DETAILED DESCRIPTION OF THE PREFERRED EMBODIMENT

Figure 1:
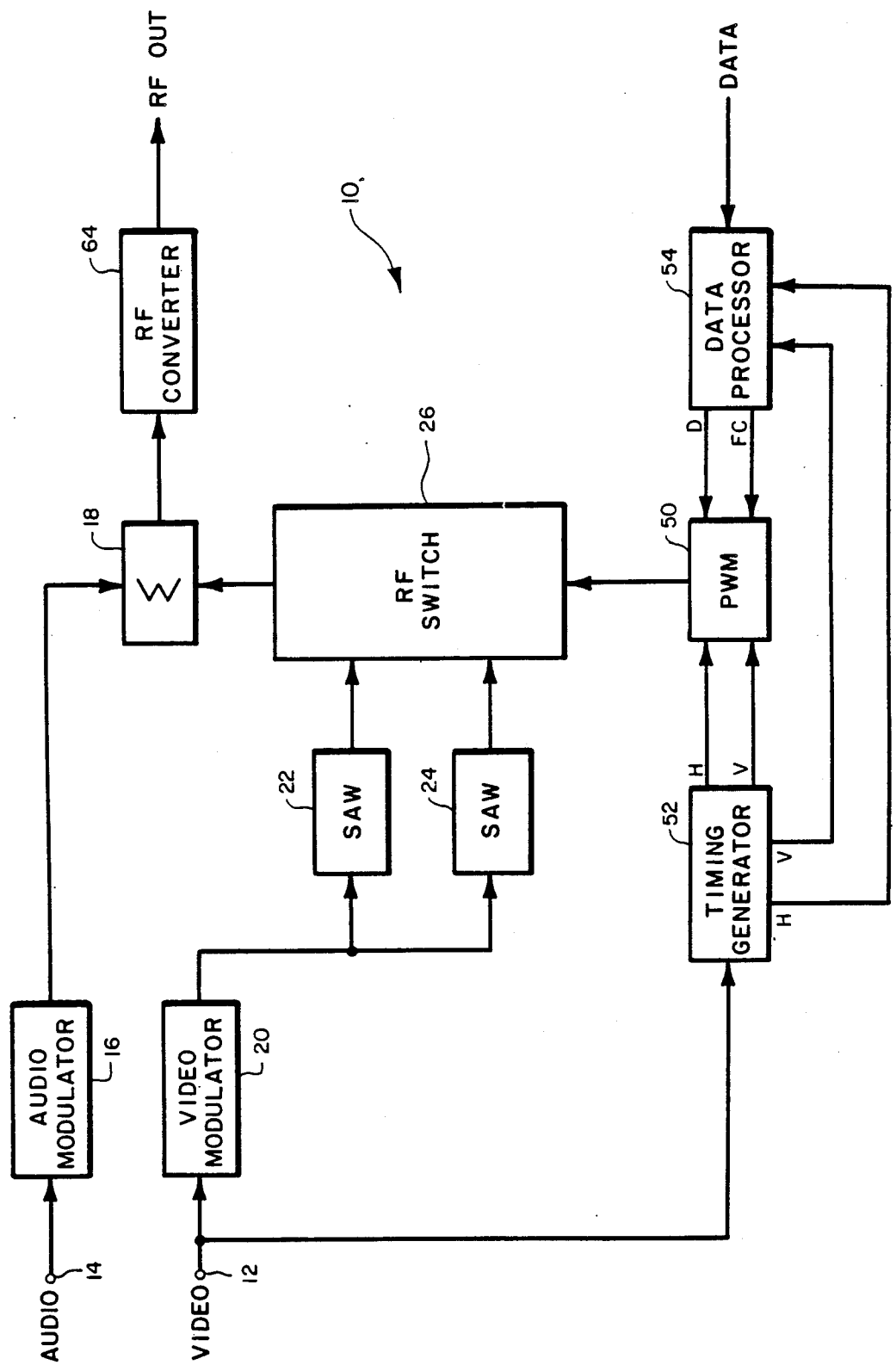
FIG. 1 is a block diagram of a television signal transmitter according to the invention.

Referring now to the drawings, FIG. 1 is a simplified block diagram illustrating a headend television signal scrambler and data encoder 10 according to the present invention. It will be understood that the signals provided by scrambler and data encoder 10 are intended to be broadcast for transmission through a suitable medium such as a coaxial cable in a CATV system for reception by the system subscribers. Each system subscriber is provided with a decoder which may be authorized for unscrambling a particular broadcast television program in response to data signals received from headend unit 10. Thus, with relation to a particular television program, an authorized subscriber will be provided with an unscrambled video image for viewing while all unauthorized parties, whether system subscribers or not, will be provided with a television signal producing a scrambled video image which is largely unintelligible when displayed on a conventional television receiver viewing screen.

With more particular reference to FIG. 1, a conventional NTSC composite baseband video signal is coupled to an input terminal 12 of headend unit 10 with the associated audio baseband signal being applied to an input terminal 14. The audio baseband signal is coupled to an audio modulator 16 where it is used to frequency modulate a sound intermediate frequency (IF) carrier, typically 41.25 MHz, which is then applied to one input of a summing circuit 18. The composite baseband video signal is coupled to a video modulator 20 where it is used to amplitude modulate a video IF carrier spaced 4.5 MHz from the sound IF carrier, i.e., 45.75 MHz. The IF video signal developed at the output of modulator 20 is applied to the inputs of a pair of filters which, in a preferred embodiment of the invention, comprise surface acoustic wave (SAW) filters 22 and 24. The outputs of SAW filters 22 and 24 are selectively coupled by an RF switch 26 to a second input of summing circuit 18. As will be explained in further detail hereinafter, the frequency response characteristics of SAW filters 22 and 24 together with the operation of RF switch 26 provide for the implementation of the novel television signal scrambling and data encoding techniques of the invention.

Figures 2A, 2B:
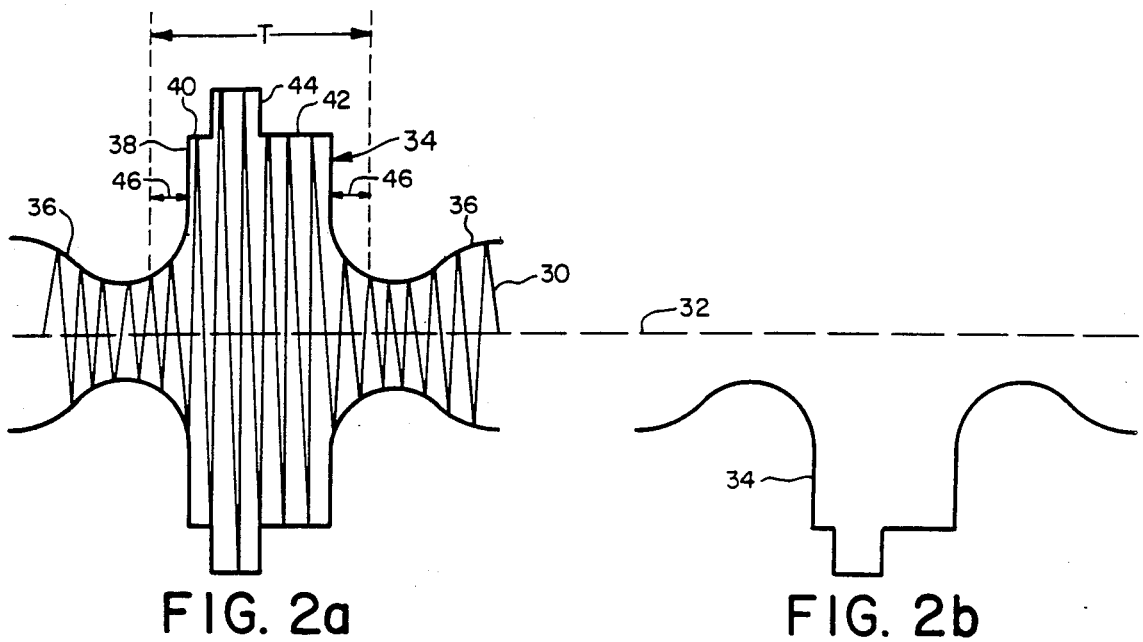
FIGS. 2A and 2B are waveform diagrams illustrating a standard NTSC RF television signal and the detected video envelope thereof.

More particularly, FIG. 2A illustrates a standard NTSC television signal of the type developed at the output of video modulator 20. The signal comprises an IF carrier 30, having a substantially fixed phase characteristic and a zero carrier level 32, amplitude modulated by a composite baseband video signal 34. Composite baseband video signal 34 comprises a plurality of horizontal trace lines 36 defining the video image, the horizontal trace lines being separated by a plurality of horizontal blanking pulses 38. Each horizontal blanking pulse includes a front porch 40 and a back porch 42, the latter typically including a 3.58 MHz reference color burst signal (not shown). Each horizontal blanking pulse, which defines a horizontal blanking interval, also includes a horizontal synchronization pulse 44 between front porch 40 and back porch 42. The horizontal synchronization pulses 44 are used to synchronize the horizontal deflection circuits of a television receiver for initiating horizontal retrace at the proper times, the viewing screen of the receiver being blanked during such retrace intervals by the horizontal blanking pulses 38.

According to NTSC standards, each horizontal banking pulse 38 has a duration of about 12 microseconds with front porch 40 comprising about 1.3 microseconds, horizontal sync pulse 44 about 5.0 microseconds and back porch 42 about 5.7 microseconds. In addition, due to the arrangement of the escutcheon in relation to the viewing screen of the receiver, a non-viewable, overscan interval 46 of about 1.5 microseconds is normally established at the beginning and end of each horizontal trace line 36 immediately adjacent blanking pulse 38.

When received by a normal television receiver, the signal of FIG. 2A is detected to reproduce composite baseband video signal 34 as illustrated by the waveform of FIG. 2B. This detection process is typically effected by a diode-type envelope detector which will, as its name suggests, detect the envelope amplitude modulating the carrier signal 30 regardless of its phase. The polarity of the detected signal in relation to the zero carrier level 32 is determined by the polarity of the detecting diode in the receiver circuitry. As illustrated in FIG. 2B, detected composite baseband video signal 34 has a negative polarity with relation to the zero carrier level 32 with black level signals being more negative than white level signals.

Figures 3A, 3B:
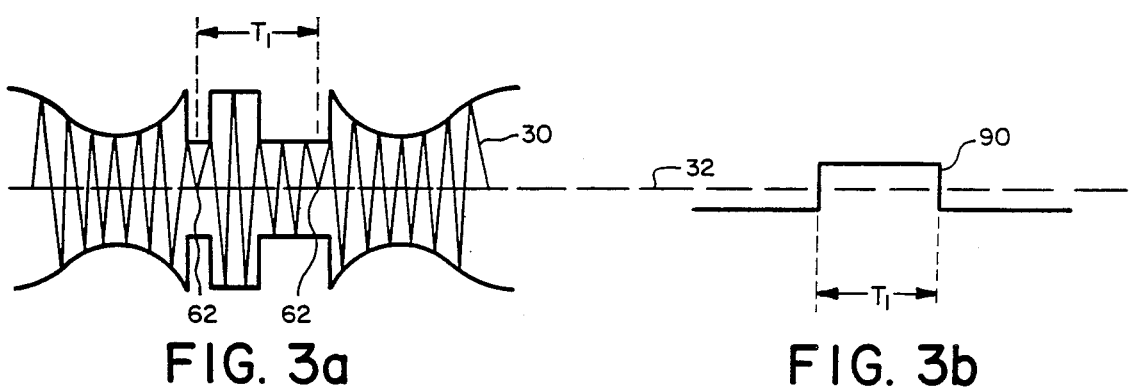
FIGS. 3A–3B and 4A–4B are waveform diagrams illustrating the manner in which the NTSC signal of FIG. 2A is modified according to the invention and the corresponding control signals produced in response thereto.
Figures 4A, 4B:
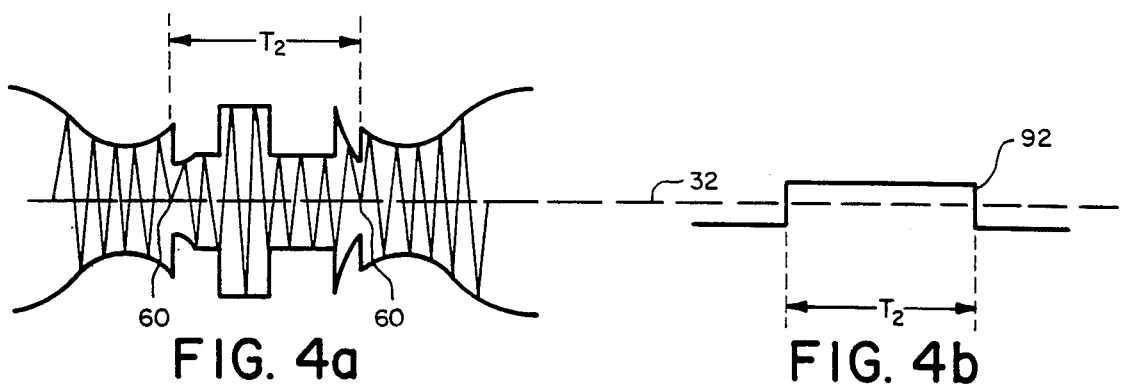

FIGS. 3A and 4A illustrate how the television signal of FIG. 2A is modified by headend unit 10 to achieve the scrambling and data encoding effects of the invention. In particular, it will be observed that the signal is suppressed below most video levels and the phase characteristic of the carrier signal 30 is changed during an encoding interval centered about each horizontal blanking pulse 38, the encoding interval having a maximum duration T (see FIG. 2A) defined by the limits of the overscan intervals 46 on either side thereof.

Thus, in FIG. 3A, the signal is suppressed in amplitude and the phase of carrier 30 is changed during an encoding interval T1 slightly less than the width of horizontal blanking pulse 38 while in FIG. 4A, amplitude suppression and carrier phase change are effected during a wider encoding interval T2 extending about one microsecond into the respective overscan intervals 46 on either side of horizontal blanking pulse 38. The amplitude suppression and carrier phase alteration imposed on the television signal during the encoding intervals serves to effectively scramble the signal while the width modulation of the encoding intervals provides a facility for the in-band transmission of data.

Figures 5A, 5B, 6A, 6B:
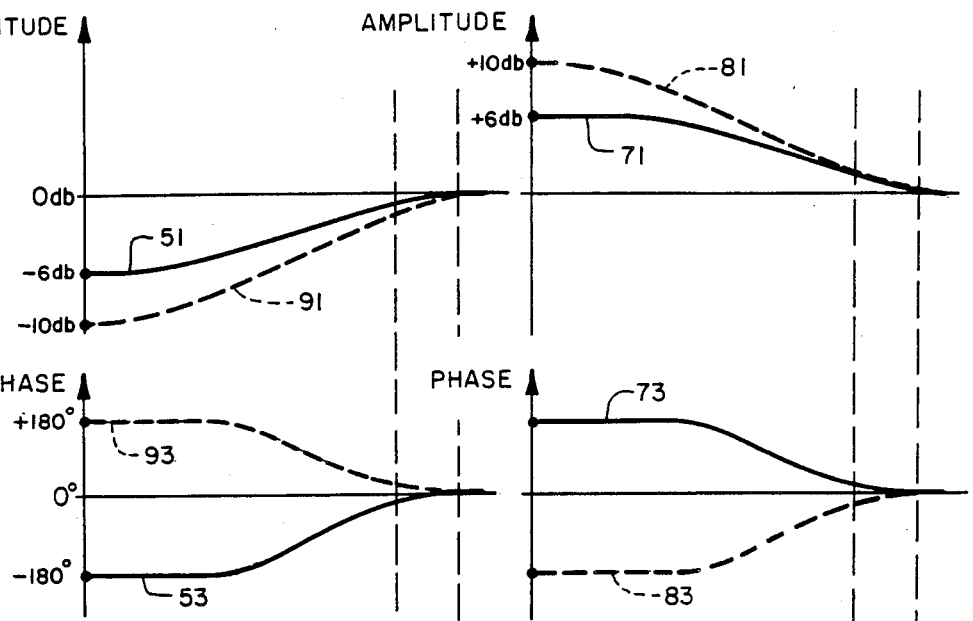
FIGS. 5A–5B and 6A–6B illustrate the amplitude and normalized phase versus frequency response characteristics of the SAW filters utilized in the transmitter and receiver of the invention.

Referring back to FIG. 1, the foregoing techniques are essentially implemented by SAW filters 22 and 24 in combination with the operation of RF switch 26. SAW filter 22, which may have a delay of about 700 nanoseconds, is designed to exhibit amplitude and normalized phase versus frequency response characteristics as shown by the solid line curves 51 and 53 in FIG. 5A. As used herein, the phrase normalized phase versus frequency response means the phase versus frequency response of a particular filter relative to the phase versus frequency response of a true delay line of the same length; i.e., the difference between the phase versus frequency response characteristics of the filter and a true delay line of the same length. It will be noted that the amplitude response 51 varies from about −6 db at the picture IF of 45.75 MHz and gradually approaches nearly 0 db at the sound IF frequency of 41.25 MHz, with a small negative offset at the chroma IF frequency of 42.17 MHz. Similarly, the normalized phase response 53 varies from about −180 degrees at the picture IF and gradually approaches 0 degrees at the sound. IF frequency with a small negative offset, preferably about 15 degrees, at the chroma IF frequency. SAW filter 24, which has a delay matched or equal to the delay of filter 22, is characterized by substantially flat amplitude and normalized phase versus frequency responses 55 and 57 at 0 db and 0 degrees respectively between the picture and sound IF frequencies as shown in FIG. 6A. Alternatively, the flat responses 55 and 57 could be offset to selected small, non-zero values.

RF switch 26 is operated in response to a pulse width modulator 50 which provides a horizontal rate output defining the width of each encoding interval. The system is operated with two different width encoding intervals T1 and T2 representing the complementary states of a respective data bit. Thus, the relatively wide encoding interval T2 shown in FIG. 4A may represent a logic "1" data bit while the narrower encoding interval T1 of FIG. 3A may represent a logic "0" data bit. Pulse width modulator 50, in response to horizontal and vertical rate timing signals supplied by a timing generator 52, couples a horizontal rate pulse width modulated signal defining the wider and narrower encoding intervals T1 and T2 to RF switch 26 in accordance with a data signal supplied by a data processor 54. That is, if a particular bit of the data signal supplied by data processor 54 is at a logic "1" level, a pulse defining the wider encoding interval T2 of FIG. 4A would be provided to RF switch 26 by modulator 50 whereas a pulse defining the narrower encoding interval T1 of FIG. 3A would be provided if the data bit was at a logic "0" level.

RF switch 26 is operative for coupling only the output of SAW filter 24 (FIG. 6A) to summing circuit 18 at all times except during an encoding interval T1 or T2 as defined by the output of pulse width modulator 50. During an encoding interval T1 or T2 only the output of SAW filter 22 (FIG. 5A) is coupled to the summing circuit. As a result, during each encoding interval T1 or T2 the IF signal coupled to summing circuit 18 by RF switch 26 is modified by the amplitude and normalized phase versus frequency response characteristics of SAW filter 22 (FIG. 5A) to produce the scrambled and data encoded signals of FIGS. 3A and 4A. In particular, signal scrambling is effected by suppressing the amplitude and altering the phase of the IF signal in accordance with the amplitude and normalized phase response characteristics 51 and 53 during the encoding intervals and data transmission is effected by modulating the width of the encoding interval between the two values T1 and T2 in accordance with the data signal supplied by data processor 54.

Since, as noted in FIG. 5A, both the attenuation and phase change imposed on the IF signal by SAW filter 22 continuously vary between the picture IF carrier (−6 db and −180 degrees respectively) and the sound IF carrier (substantially zero db and zero degrees), different frequency components of the signal will be subjected to varying degrees of attenuation and phase shift. For example, due to the 180 degree phase shift imposed on the signal at the picture IF carrier, frequency during the encoding interval the 3.58 MHz reference chroma burst will be detected by a conventional intercarrier receiver at nearly the opposite polarity in relation to an unencoded reference chroma burst. The use of this opposite polarity reference chroma burst to decode the color information in the video signal will result in the production of colors which are nearly the complements of the transmitted chroma information thereby further enhancing signal scrambling. Similarly, an intercarrier receiver will couple a 4.5 MHz intercarrier sound signal having the wrong polarity to the sound circuits of the receiver during the encoding intervals resulting in the production of a distorted audio signal.

As mentioned previously, the width of the encoding intervals defined by the output of pulse width modulator 50 are modulated between two values T1 and T2 in accordance with the data signal supplied to the modulator by data processor 54. In a preferred embodiment of the invention, the encoding intervals are centered on the horizontal blanking pulses 38 and have a first width or duration T2 extending about 0.5 microseconds into the overscan intervals 46 on either side of the blanking pulse as shown by the phase reversal of carrier 30 at points 60 in FIG. 4A. It will be seen that this results in a pulse width of about 13 microseconds. The phase reversal points 60 of the encoding interval T2 thereby extend into the active video region of the television signal making them extremely difficult to detect with conventional means. The second width or duration T1 of the encoding interval is preferably defined by a pair of phase reversal points 62 respectively located in the front and back porches 40 and 42 of the horizontal blanking pulse as shown in FIG. 3A. In particular, the phase reversal points 62 are located about 0.5 microseconds from either edge of the horizontal blanking pulse 38 such that the width of the encoding interval T1 is about 11 microseconds. Thus, in the preferred embodiment of the invention, the difference between the two widths T1 and T2 of the encoding intervals is about 2 microseconds although satisfactory operation has been achieved with differences as small as 1 microsecond. It has been found that centering the encoding interval with respect to the horizontal blanking pulse helps reduce audio buzz in the reproduced signal.

The scrambed and data encoded video IF signal (FIGS. 3A and 4A) produced at the output of RF switch 26 is combined in summing circuit 18 with the IF audio signal and applied to an RF converter 64. RF converter 64 converts the combined IF signal to a standard RF television frequency for transmission through the cable system. In this regard, it is to be understood that while the scrambling and data encoding techniques of the invention have been described in relation to IF signals, the scrambling and data encoding could just as easily have been performed in connection with the transmitted channel frequency at the output of converter 64. Thus, as used herein, the term RF frequency is considered to include both the IF frequency as well as the transmitted channel frequency.

Figure 7:
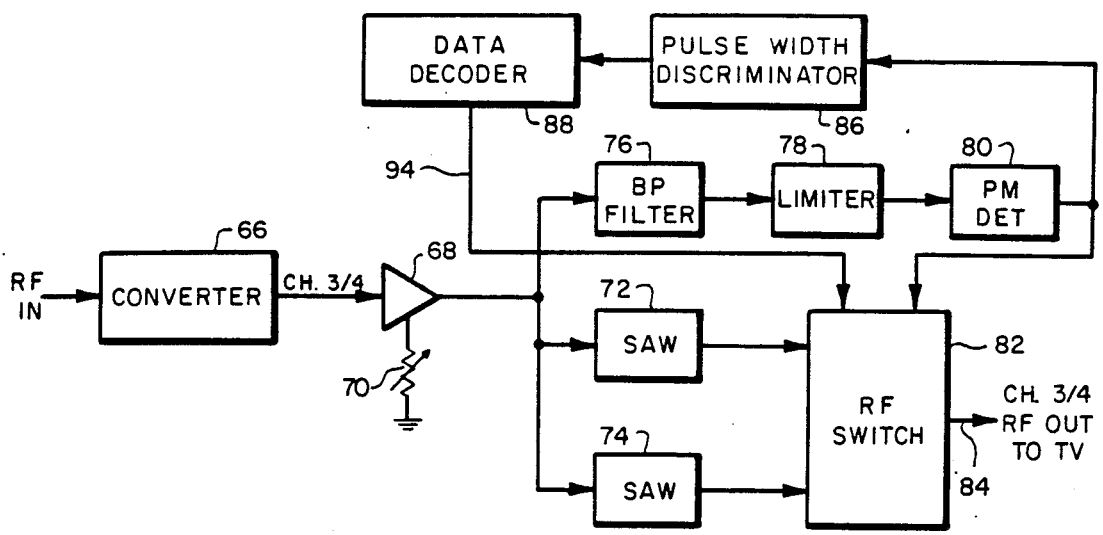
FIG. 7 is a block diagram showing a decoder operable in response to transmitted data of the type represented in FIGS. 3A and 4A.

FIG. 7 illustrates a preferred embodiment of a decoder adapted to unscramble and decode the data in the transmitted signal. The decoder comprises an RF converter 66 which receives the transmitted signal and converts it to the frequency of, for example, either channel 3 or 4. Assuming conversion to channel 3 frequency, the converted channel 3 signal is coupled through an amplifier 68, whose gain is controlled by a potentiometer 70, to the inputs of a SAW filter 72, a SAW filter 74 and a bandpass filter 76. The output of bandpass filter 76 is coupled through a limiter 78 to the input of a phase modulation detector 80 whose output controls an RF switch 82 for selectively coupling either the output of SAW filter 72 or the output of SAW filter 74 to an output line 84 for application to the subscriber's television receiver.

FIG. 5B illustrates the amplitude and normalized phase versus frequency response characteristics 71 and 73 of SAW filter 72 at channel 3 frequencies. It will be seen that these response characteristics are the complements of the corresponding characteristics 51 and 53 of SAW filter 22 (FIG. 5A). Thus, the amplitude response 71 of filter 72 varies from +6 db at the channnel 3 picture carrier toward 0 db at the channel 3 sound carrier in a manner complementary to the amplitude response characteristic 51 of SAW filter 22. Similarly, the normalized phase response 73 of filter 72 varies from a +180 degrees at the channel 3 picture carrier toward zero degrees at the channel 3 sound carrier in a manner complementary to the phase response characteristic 53 of SAW filter 22. It will be understood that SAW filter 72 may include suitable gain circuitry to achieve the depicted amplitude response characteristic. The amplitude and normalized phase versus frequency response characteristics 75 and 77 of SAW filter 74 are shown in FIG. 6B and will be seen to comprise flat responses at 0 db and 0 degrees respectively between the channel 3 picture and sound carriers. Also, both SAW filters 72 and 74 have average delays matched to each other.

In view of the foregoing, it will be appreciated that the received signal can be unscrambled by the decoder by operating RF switch 82 for coupling the output of SAW filter 72 to output line 84 during each encoding interval T1 and T2 and otherwise coupling the output of SAW filter 74 to output line 84. Due to the complementary nature of the response characteristics of SAW filters 22 and 72, this will result in the restoration of amplitude and phase of the received signal during the encoding intervals such that the output of RF switch 82 will correspond to the standard NTSC waveform illustrated in FIG. 2A.

As mentioned previously, the operation of RF switch 82 is controled by phase modulation detector 80 which, in a preferred embodiment of the invention comprises a bi-phase stable phase modulation detector of the type taught in U.S. Pat. No. 4,072,909. Bandpass filter 76, which also preferably comprises a SAW filter, has a relatively narrow response for coupling the channel 3 picture carrier to the input of limiter 78. Limiter 78 removes the amplitude modulation from the channel 3 picture carrer and applies the resulting amplitude limited signal to the input of phase modulation detector 80. Detection by phase modulation detector 80 is effected by a vector multiplication process whereby the applied carrier signal is multiplied with a fixed phase reference signal. As a result, the amplitude limited channel 3 picture carrier applied to detector 80 will produce a detected signal exhibiting a phase reversal during each encoding interval T1 or T2 as represented by the "super-white" level (i.e., a level above the zero carrier axis 32) pulses 90 and 92 in FIGS. 3B and 4B. Detected pulse 92 corresponds to the wider encoding interval T2 characterizing a received signal of the type shown in FIG. 4A while detected pulse 90 corresponds to the narrower encoding interval T1 characterizing a received signal of the type shown in FIG. 3A.

The detected signals illustrated in FIGS. 3B and 4B produced at the output of phase modulation detector 80 are applied for controlling the operation of RF switch 82. In particular, when the detected signal is characterized by a low level, the output of SAW filter 74 is switched to output 84. However, in response to a pulse 90 or 92, the output of SAW filter 72 is switched to output 84 for the duration of the pulse. As previously explained, this operation of RF swich 82 will effectively unscramble the received signal.

The detected signals developed at the output of phase modulation detector 80 are also applied to the input of a pulse width discriminator 86. Pulse width discriminator 86 is responsive to the width of pulses 90 and 92 for coupling complementary state logic signals to the input of a data decoder 88. For example, pulse width discriminator 86 may couple a logic "1" data bit to data decoder 88 in response to a relatavely wide pulse 92 and a logic "0" data bit in response to a narrow pulse 90. Data decoder 88 decodes these data bits for controlling various aspects of the decoder. For example, the decoded data bits may represent a data message deauthorizing the decoder in which case an appropriate signal may be applied over a conductor 94 for disabling RF switch 82. Of course, numerous other aspects of the decoder could be controlled in a similar manner.

Figure 8:
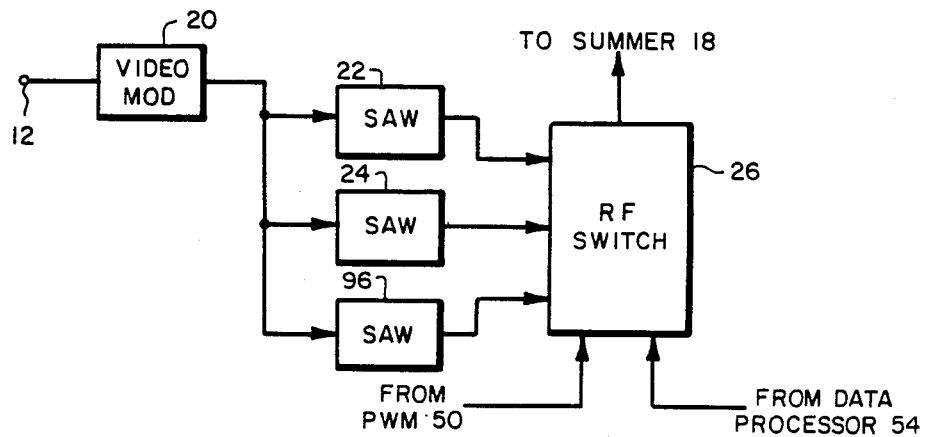
FIGS. 8 and 9 are block diagrams of alternate embodiments of the transmitter and decoder of the invention.
Figure 9:
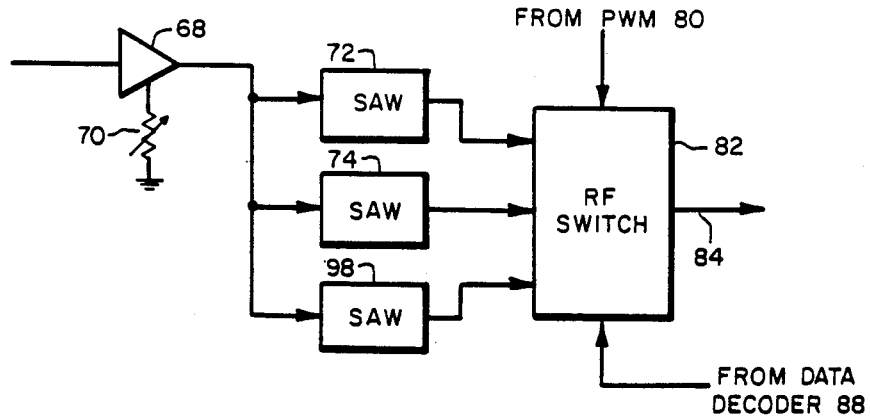

FIGS. 8 and 9 illustrate alternate embodiments of the headend unit and decoder depicted in FIGS. 1 and 7 which provide for an increased level of signal scrambling. Referring to FIG. 8, it will be seen that the headend unit 10 has been modified by adding a third SAW filter 96 in parallel with SAW filters 22 and 24 and by coupling an output of data processor 54 to RF switch 26. SAW filter 96 has the amplitude and normalized phase versus frequency response characteristics 91 and 93 shown in dotted-line in FIG. 5A. It will be seen that the amplitude response 91 is similar to that of SAW filter 22 except that it has been displaced downwardly with the attenuation at the IF picture carrier frequency being −10 db instead of −6 db. The normalized phase response 93, on the other hand, has been folded over the zero degree axis such that the 180 degree phase reversal at the IF picture carrier frequency is retained. RF switch 26 is responsive to a control signal from data processor 54 for causing the switch to select either the output of SAW filter 22 or the output of SAW filter 96 for coupling to summing circuit 18 during the encoding intervals T1 and T2. The scrambling effect produced by the selection of either filter 22 or 96 during the encoding intervals will be similar except that a greater amount of attenuation and the opposite polarity phase alteration will result when filter 96 is selected instead of filter 22.

It will be appreciated that the foregoing operation of headend unit 10 results in a dynamic system having mutiple scrambling modes which can be established by selectively switching between SAW filters 22 and 96 during encoding intervals T1 and T2. For example, the output of SAW filter 22 may be coupled to summer 18 during encoding intervals T1 and T2 for a given period of time after which the output of SAW filter 96 is coupled to summer 18 during encoding intervals T1 and T2 for another given period of time, and so on. RF switch 26 couples the output of either SAW filter 22 or SAW filter 96 to summer 18 during encoding intervals T1 and T2 in accordance with a control signal from data processor 54. In addition, data processor 54 generates and couples an appropriate mode select data message to pulse width modulator 50 defining which of filters 22 or 96 has been selected. This mode select data message is converted by pulse width modulator 50 to a corresponding sequence of pulses 90 and 92 to effect the transmission of the data message to the system decoders by modulating the width of the encoding intervals as previously described. In this way, the decoders may be instructed as to whether the output of SAW filter 22 or the output of SAW filter 96 is being transmitted during the encoding intervals.

Referring to FIG. 9, it will be observed that the decoder has been modified by adding a third SAW filter 98 whose amplitude and normalized phase versus frequency response characteristics 81 and 83 are complementary to those of SAW filter 96 as illustrated in dotted-line in FIG. 5B. Data decoder 88, in response to a received mode select data message from headend unit 10, couples a control signal to RF switch 82 for selecting the output of the appropriate one of SAW filters 72 and 98 during the encoding intervals for application to output 84. That is, in the dynamic mode, data decoder 88 is responsive to received mode select data messages for causing the output of SAW filter 72 to be applied to conductor 84 whenever SAW filter 22 is being used at the headend and for causing the output of SAW filter 98 to be applied to conductor 84 whenever SAW filter 96 is being used at the headend.

While particular embodiments of the invention have been shown and described, it will be obvious to those skilled in the art that changes and modifications may be made without departing from the invention in its broader aspects. Therefore, the aim in the appended claims is to cover all such changes and modificatons as fall within the true spirit and scope of the invention.

What is claimed is:

1. A television signal data transmission system comprising:
    means for developing an RF television signal including an amplitude modulated RF video component and a frequency modulated RF audio component;
    means for defining a plurality of encoding intervals each characterized by at least a first width or a second width respectively representing different states of a data bit, each of said encoding intervals having a duration substantially time coincident with a respective horizontal blanking interval of said RF television signal;
    means for altering the phase of the video component of said RF television signal during said encoding intervals according to as predetermined function that varies non-linearly with frequency between the carrier frequencies of said video and audio components;
    means for transmitting said phase altered RF television signal;
    means for receiving said transmitted signal;
    phase modulation detection means responsive to said received signal for detecting said width modulation encoding intervals; and
    pulse width discriminator means responsive to said detected width modulating encoding intervals for deriving said data bits in terms of said different logic states.

2. A television signal data transmission system according to claim 1 wherein said means for altering the phase of said video component comprises a first filter having a given delay and a substantially flat normalized phase versus frequency response between the video and audio carrier frequencies of said television signal, a second filter having said given delay and a normalized phase versus frequency response non-linearly varying between first and second different predetermined normalized phase shifts at the video and audio carrier frequencies respectively of said television signal, means for coupling at least said RF video component to the inputs of said first and second filters, and means for selecting the output of said second filter for transmission during said width modulating encoding intervals and otherwise selecting the output of said first filter for transmission.

3. A television signal data transmission system according to claim 2 wherein said first width corresponds to an encoding interval extending between two points respectively located within the non-viewable, overscan portions of the video lines immediately adjacent and on either side of a respective horizontal blanking interval of said television signal, said second width corresponding to an encoding interval having a duration less than that of said first width.

4. A television signal data transmission system according to claim 2 wherein said first filter has a substantially flat amplitude versus frequency response characteristic and wherein said second filter has an amplitude versus frequency response characteristic varying between first and second different predetermined levels of attenuation at the video and audio carrier frequencies of said television signal respectively.

5. A television signal data transmission system according to claim 4 wherein said means for defining comprises means for defining said encoding intervals symmetrically about the center of said horizontal blanking intervals.

6. A television signal data transmission system according to claim 5 wherein said means for defining comprises means for defining the width of said encoding intervals such that the difference between said first and second widths has a minimum value of one microsecond and a maximum value of two microseconds.

7. A television signal data transmission system according to claim 1 wherein said phase modulation detection means comprises a bi-phase stable phase modulation detector.

8. A television signal data transmission system according to claim 7 wherein said means for receiving comprises means for removing the amplitude modulation from the video carrier of said received television signal and means for coupling said amplitude limited signal to said phase modulation detection means.

9. A television signal data transmission system according to claim 5 wherein said first and second filters comprise respective SAW filters, wherein said first predetermined normalized phase shift comprises 180 degrees and wherein said second predetermined normalized phase shift and said second predetermined level of attenuation comprise substantially zero degrees and zero db respectively.

10. A television signal data transmission system according to claim 9 wherein said means for altering comprises a third SAW filter having said given delay and amplitude and normalized phase versus frequency response characteristics that vary non-linearly with frequency between the carrier frequencies of said video and audio components in a manner different from the response characteristic of said second SAW filter with the normalized phase shift at the video carrier frequency being equal in magnitude and of opposite polarity to the normalized phase shift of said second SAW filter at the video carrier frequency, means for coupling said RF video component to the input of said third SAW filter, and means for selectively selecting the output of said third SAW filter in place of said second SAW filter for transmission during said width modulated encoding intervals.

11. A television signal data transmission system according to claim 10 wherein the amplitude and normalized phase versus frequency response characteristics of said second and third SAW filters are offset in opposite polarities from their respective zero level axes by selected equal amounts at the chroma carrier frequency of said television signal.

12. A television signal data transmission system, comprising:
   means for developing a data message comprising a plurality of complementary state data bits;
   pulse width modulation means responsive to said data message for developing a periodically recurring pulse width modulated signal having a first width representing a first state of each of said data bits and a second width representing the complementary state of each of said data bits, said first width having a duration extending between two points respectively located within the non-viewable overscan portions of the horizontal scanning lines immediately adjacent and on either side of a respective horizontal blanking interval of said television signal, said second width having a duration less than that of the first width;
   a first SAW filter having a given delay and a substantially flat normalized phase versus frequency response between the video and audio carriers of said television signal;
   a second SAW filter having said given delay and a normalized phase versus frequency response non-linearly varying between 180 degrees and substantially zero degrees at the video and audio carriers respectively of said television signal;
   means for coupling an RF video signal to the inputs of said first and second SAW filters;
   means responsive to said pulse width modulation means for transmitting the output of said second SAW filter during each of said width modulated intervals and otherwise transmitting the output of said first SAW filter;
   means for receiving said transmitted signal;
   phase modulation detection means responsive to the received signal for detecting said width modulated intervals; and
   pulse width discriminator means responsive to said detected width modulated intervals for deriving said data message.

13. A television signal data transmission system according to claim 12 wherein said pulse width modulation means comprises means for symmetrically modulating the width of each of said intervals about the center of a respective horizontal blanking interval.

14. A television signal data transmission system according to claim 13 wherein said pulse width modulation means comprises means for modulating the width of said intervals such that the difference between said first and second widths has a minimum value of one microsecond and a maximum value of two microseconds.

15. A television signal data transmission system according to claim 13 wherein said first SAW filter has a substantially flat amplitude versus frequency response characteristic and wherein said second SAW filter has an amplitude versus frequency response characteristic non-linearyly varying between a predetermined attenuation and substantially zero attenuation at the video and audio carrier frequencies of said television signal respectively.

16. A television signal data transmission system according to claim 15 wherein said phase modulation detection means comprises a bi-phase stable phase modulation detector.

17. A television signal data transmission system according to claim 16 wherein said means for receiving comprises means for removing the amplitude modulation from the video carrier of said received RF television signal and means for coupling said amplitude limited signal to said phase modulation detection means.

18. A television signal data transmission system according to claim 12 wherein said means for transmitting comprises a third SAW filter having said given delay and amplitude and normalized phase versus frequency response characteristics corresponding to said second SAW filter but folded over its respective zero level axes, means for coupling said RF video signal to the input of said third SAW filter, and means for selectively transmitting the output of said third SAW filter in place of said first SAW filter during said width modulated intervals.

19. A television signal data transmission system according to claim 18 wherein the amplitude and phase versus normalized frequency response characteristics of said second and third SAW filters are offset in opposite polarities from their respective zero level axes by selected equal amounts at the chroma carrier frequency of said television signal.

20. A combination television signal encoding and data transmission system comprising:
　means for developing an RF television signal including an amplitude modulated RF video component and a frequency modulated RF audio component;
　means for defining a plurality of encoding intervals, each characterized by at least a first or a second predetermined characteristic respectively representing different states of a data bit, each of said encoding intervals having a duration substantially time coincident with a respective horizontal blanking interval of said RF television signal;
　means for encoding the video component of said RF television signal during said encoding intervals according to a predetermined frequency-dependent, non-linear function;
　means for transmitting said encoded RF television signal;
　means for receiving said transmitting signal;
　detection means responsive to said received signal for detecting said encoding intervals and having a characteristic complementary to said predetermined function for decoding said RF television signal; and
　means responsive to said first and said second predetermined characteristics for determining the state of the data bit represented by the encoding interval.

21. The combination of claim 19 wherein said first or said second predetermined characteristic comprises the width of the encoding intervals and wherein said means for encoding comprises means for altering the phase and attenuating the amplitude of the video component of said RF television signal during said encoding intervals.

22. The combination of claim 20 wherein said predetermined function varies with frequency between the carrier frequencies of said video and said audio components.

23. A combination television signal encoding and data transmission system comprising:
　means for developing an RF television signal including an amplitude modulated RF video component and a frequency modulated RF audio component;
　means for defining a plurality of encoding intervals each characterized by at least a first width or a second width, respectively representing different states of a data bit, each of said encoding intervals having a duration substantially time coincident with a respective horizontal blanking interval of said RF television signal;
　means for varying the amplitude and altering the phase of the video component of said RF television signal during said encoding intervals according to respective predetermined non-linear functions that vary with frequency between the carrier frequencies of said video and audio functions that vary non-linearly with frequency between the carrier frequencies of said video and audio components or according to respective third and fourth functions that vary non-linearly with frequency between said video and audio component carrier frequencies in a manner different from said first and second functions;
　means for causing said data bits to represent a data message reflecting whether said RF video component is being varied and altered during said encoding intervals according to said first and second or said third and fourth functions;
　means for transmitting said amplitude varied and phase altered RF television signal;
　means for receiving said transmitted signal;
　phase modulation detection means responsive to said received signal for detecting said width modulated encoding intervals;
　pulse width discriminator means responsive to said detected width modulated encoding intervals for deriving said data bits in terms of said complementary logic states;
　first filter means having a given delay and having amplitude and phase versus frequency response characteristics comprising the complements of said first and second functions respectively;
　second filter means having said given delay and having amplitude and phase versus frequency response characteristics comprising the complements of said third and fourth functions respectively;
　third filter means having said given delay and having substantially flat amplitude and phase versus frequency response characteristics; components;
　means for transmitting said phase altered and amplitude varied RF television signal;
　means for receiving said transmitting signal;
　phase modulation detection means responsive to said received signal and detecting said width modulating encoding intervals;

decoding means responsive to said detected intervals and having amplitude and phase response characteristics complementary to said predetermined functions for decoding said RF television signals; and pulse width discriminator means responsive to said detected width modulated encoding intervals for deriving said data bits in terms of said different logic states.

24. A combination television signal encoding and data transmission system comprising:

means for developing an RF television signal including an amplitude modulated RF video component and a frequency modulated RF audio component;

means for defining a plurality of encoding intervals each characterized by at least a first width or a second width, respectively representing different states of a data bit, each of said encoding intervals having a duration substantially time coincident with a respective horizontal blanking interval of said RF television signal;

means for selectively varying the amplitude and altering the phase of the video component of said RF television signal during said encoding intervals according to respective first and second means for coupling said received signal to the inputs of said first, second and third filter means;

an output terminal; and means responsive to the data message represented by said derived data bits for selectively coupling the output of said first or second filter means to said output terminal during said detected encoding intervals and otherwise coupling the output of said third filter means to said output terminal.

25. A receiver for processing an encoded RF television signal having an RF video component whose amplitude and phase are altered during a plurality of encoding intervals according to respective first and second functions that vary non-linearly with frequency between the carrier frequencies of the video and audio compoennts of said RF television signal, each of said encoding intervals being characterized by a first width or a second width respectively representing complementary states of a data bit and each having a duration substantially time coincident with a respective horizontal blanking interval of said RF television signal, comprising:

means for receiving said encoded television signal;

phase modulation detection means responsive to said received signal for detecting said width modulated encoding intervals;

decoding means responsive to said detected intervals and having amplitude and phase response characteristics respectively comprising the complements of said first and second functions for decoding said RF television signal; and pulse width discriminator means responsive to said detected width modulated encoding intervals for deriving said data bits in terms of said complementary logic states.

26. A receiver according to claim 25 wherein said first and second functions respectively comprise functions that vary between a predetermined attenuation and a 180 degree phase shift at the video component carrier frequency and substantially zero attenuation and zero phase shift at the audio component carrier frequency and wherein said decoding means comprises:

a first filter having a selected delay and having amplitude and phase versus frequency response characteristics comprising the complements of said first and second functions respectively;

a second filter having said selected delay and having substantially flat amplitude and phase versus frequency response characteristics;

means for coupling said received signal to the inputs of said first and second filters;

an output terminal; and means responsive to said detected intervals for coupling the output of said first filter to said output terminal and otherwise coupling the output of said second filter to said output terminal.

27. A receiver according to claim 26 including bandpass filter and limiter means responsive to said received signal for coupling the picture carrier characterizing said received signal to said phase modulation detection means in amplitude limited form.

28. A receiver according to claim 26 wherein said first and second filters each comprise respective SAW filters.

29. A receiver for processing a received RF television signal having an encoded RF video component whose amplitude and phase are altered during a plurality of encoding intervals according to respective first and second functions that vary non-linearly with frequency between the carrier frequencies of the video and audio components of said RF television signal, each of said encoding intervals being characterized by a first width or a second width respectively representing complementary states of a data bit and each having a duration substantially time coincident with a respective horizontal blanking interval of said RF television signal, comprising:

a first filter having a selected delay and having amplitude and phase versus frequency response characteristics comprising the complements of said first and second functions respectively;

a second filter having said selected delay and having substantially flat amplitude and phase versus frequency response characteristics;

means for coupling said received signal to the inputs of said first and second filters;

an output terminal;

means for detecting said width modulated encoding intervals;

means responsive to said detected intervals for coupling the output of said first filter to said output terminal and otherwise coupling the output of said second filter to said output terminal; and means responsive to said detected intervals for deriving said data bits in terms of said complementary logic states.

30. A receiver according to claim 29 wherein said RF video component is selectively altered in amplitude and phase during said encoding intervals according to said respective first and second functions or according to respective third and fourth functions that vary non-linearly with frequency between said video and audio component carrier frequencies in a manner different from said first and second functions and wherein said data bits represent a data message reflecting whether said RF video component is being altered during said encoding intervals according to said first and second or third and fourth functions, said receiver further comprising:

a third filter having said selected delay and having amplitude and phase versus frequency response characteristics comprising the complements of said third and fourth functions respectively;

means for coupling said received signal to the input of said third filter; and means responsive to the data message represented by said derived data bits for selectively coupling the output of said first filter or the output of said third filter to said output terminal in response to said detected intervals.

31. A receiver according to claim 30 wherein said first, second and third filters comprise respective SAW filters.

32. A receiver according to claim 31 including bandpass filter and limiter means responsive to said received signal for coupling the picture carrier characterizing said received signal to said detection means in amplitude limited form.

* * * * *

UNITED STATES PATENT AND TRADEMARK OFFICE
CERTIFICATE OF CORRECTION

PATENT NO. : 4,706,284

DATED : November 10, 1987

INVENTOR(S) : Citta et al

It is certified that error appears in the above-identified patent and that said Letters Patent is hereby corrected as shown below:

Claim 1, column 8, line 55, please delete "as" and insert therefor --a--.
Claim 15, column 11, line 8, please delete "non-linearyly" and insert therefor --non-linearly--.
Claim 21, column 12, line 1, please delete "19" and insert therefor --20--.
Claim 23, in columns 12 and 13, should be deleted, and therefore substitute the following:

--23. A combination television signal encoding and data transmission system comprising:

means for developing an RF television signal including an amplitude modulated RF video component and a frequency modulated RF audio component;

means for defining a plurality of encoding intervals each characterized by at least a first width or a second width, respectively representing different states of a data bit, each of said encoding intervals having a duration substantially time coincident with a respective horizontal blanking interval of said RF television signal;

means for varying the amplitude and altering the phase of the video component of said RF television signal during said encoding intervals according to respective predetermined non-linear functions that vary with frequency between the carrier frequencies of said video and audio components;

means for transmitting said phase altered and amplitude varied RF television signal;

means for receiving said transmitting signal;

phase modulation detection means responsive to said received signal for detecting said width modulating encoding intervals;

decoding means responsive to said detected intervals and having amplitude and phase response characteristics complementary to said predetermined functions for decoding said RF television signals; and pulse width discriminator means responsive to said detected width modulated encoding intervals for deriving said data bits in terms of said different logic states.--

UNITED STATES PATENT AND TRADEMARK OFFICE
CERTIFICATE OF CORRECTION

PATENT NO. : 4,706,284

DATED : November 10, 1987

INVENTOR(S) : Citta et al

It is certified that error appears in the above-identified patent and that said Letters Patent is hereby corrected as shown below:

Claim 24, column 13, lines 10-35, should be deleted, and therefor substitute the following:

--24. A combination television signal encoding and data transmission system comprising:

means for developing an RF television signal including an amplitude modulated RF video component and a frequency modulated RF audio component;

means for defining a plurality of encoding intervals each characterized by at least a first width or a second width, respectively representing different states of data bit, each of said encoding intervals having a duration substantially time coincident with a respective horizontal blanking interval of said RF television signal;

means for selectively varying the amplitude and altering the phase of the video component of said RF television signal during said encoding intervals according to respective first and second functions that vary non-linearly with frequency between the carrier frequencies of said video and audio components or according to respective third and fourth functions that vary non-linearly with frequency between said video and audio component carrier frequencies in a manner different from said first and second functions;

means for causing said data bits to represent a data message reflecting whether said RF video component is being varied and altered during said encoding intervals according to said first and second or said third and fourth functions;

means for transmitting said amplitude varied and phase altered RF television signal;

means for receiving said transmitted signal;

phase modulation detection means responsive to said received signal for detecting said width modulated encoding intervals;

pulse width discriminator means responsive to said detected width modulated encoding intervals for deriving said data bits in terms of said complementary logic states;

UNITED STATES PATENT AND TRADEMARK OFFICE
CERTIFICATE OF CORRECTION

PATENT NO. : 4,706,284　　　　　　　　　　　　　　　　　Page 3 of 3

DATED　　　: November 10, 1987

INVENTOR(S) : Citta et al

It is certified that error appears in the above-identified patent and that said Letters Patent is hereby corrected as shown below:

first filter means having a given delay and having amplitude and phase versus frequency response characteristics comprising the complements of said first and second functions respectively;
　　second filter means having said given delay and having amplitude and phase versus frequency response characteristics comprising the complements of said third and fourth functions respectively;
　　third filter means having said given delay and having substantially flat amplitude and phase versus frequency response characteristics;
　　means for coupling said received signal to the inputs of said first, second and third filter means;
　　an output terminal; and
　　means responsive to the data message represented by said derived data bits for selectively coupling the output of said first or second filter means to said output terminal during said detected encoding intervals and otherwise coupling the output of said third filter means to said output terminal.--

Claim 25, column 13, line 41, please delete "compoennts" and insert therefor --components--.

Signed and Sealed this

Twenty-eighth Day of July, 1992

*Attest:*

DOUGLAS B. COMER

*Attesting Officer*　　　　　　　*Acting Commissioner of Patents and Trademarks*